(12) United States Patent
Schreiber

(10) Patent No.: US 7,742,385 B2
(45) Date of Patent: Jun. 22, 2010

(54) HYBRID OPTICAL DATA CARRIER HAVING A MODIFIED CD LAYER

(76) Inventor: Stefan Schreiber, Rua de Moçambique 27, 4°, 1170-243 Lissabon (PT)

( * ) Notice: Subject to any disclaimer, the term of this patent is extended or adjusted under 35 U.S.C. 154(b) by 652 days.

(21) Appl. No.: 10/578,125

(22) PCT Filed: Oct. 27, 2004

(86) PCT No.: PCT/EP2004/012157
§ 371 (c)(1),
(2), (4) Date: May 2, 2006

(87) PCT Pub. No.: WO2005/043517
PCT Pub. Date: May 12, 2005

(65) Prior Publication Data
US 2007/0076576 A1  Apr. 5, 2007

(30) Foreign Application Priority Data
Nov. 3, 2003 (DE) ................................ 103 51 166

(51) Int. Cl.
*G11B 7/24* (2006.01)
(52) U.S. Cl. .................. 369/275.4; 369/94; 369/283; 369/286
(58) Field of Classification Search ............ 369/275.4, 369/283, 286
See application file for complete search history.

(56) References Cited

U.S. PATENT DOCUMENTS 5,233,582 A * 8/1993 Tanno et al. ............ 369/44.23

(Continued)

FOREIGN PATENT DOCUMENTS

DE   29914540   10/1999

(Continued)

OTHER PUBLICATIONS

Technical report entitled "ECMA Standardizing Information and Communication Systems", 3rd Edition, Apr. 2001, found on the world wide web at <<http://www.ecma.ch>>.

(Continued)

*Primary Examiner*—Wayne R Young
*Assistant Examiner*—Brenda Bernardi
(74) *Attorney, Agent, or Firm*—Fox Rothschild LLP; Robert J. Sacco

(57) ABSTRACT

The invention relates to an optical data carrier which combines a CD layer with at least one further format, such as a DVD layer for example. If a hybrid data carrier of this kind is to be produced in a thickness of less than 1.7 mm, and preferably in a thickness of 1.5 mm or less, then, seen from the surface which is to be read from, the CD layer will normally be situated at a depth of considerably less than 1.1 mm, and the CD substrate therefore has to be thinned down. The quality of the reading signals obtained is increased by increasing the length of the optically readable structures of the CD layer in comparison with the values which are usual in this case. Because of the difficulties which certain CD players have in focussing when the substrates are thin, the refractive index of the disc material used is reduced from the figure for polycarbonate, at least in the case of the CD substrate, the recommended range being between 1.40 and 1.55. The compatibility of the CD layer of a hybrid disc according to the invention with different players may be further increased by widening its readable structures in comparison with normal values and thus by making them more than 500 nm wide.

36 Claims, 1 Drawing Sheet

U.S. PATENT DOCUMENTS

| | | | |
|---|---|---|---|
| 5,828,648 | A | 10/1998 | Takasu et al. |
| 6,009,072 | A | 12/1999 | Tsuchiya et al. |
| 6,241,843 | B1 | 6/2001 | Kaneko et al. |
| 6,324,155 | B1* | 11/2001 | Maeda .................... 369/275.1 |
| 6,434,107 | B1 | 8/2002 | Artigalas et al. |
| 2002/0155247 | A1* | 10/2002 | Arakawa et al. ........... 428/65.3 |
| 2003/0129408 | A1* | 7/2003 | Thompson et al. ....... 428/411.1 |
| 2003/0137913 | A1* | 7/2003 | Oshima et al. ........... 369/47.55 |
| 2003/0155871 | A1* | 8/2003 | Maekawa ................... 315/291 |
| 2003/0172286 | A1* | 9/2003 | Gotoh et al. ................ 713/193 |
| 2003/0174595 | A1* | 9/2003 | Wilkinson et al. ....... 369/44.13 |
| 2003/0218966 | A1* | 11/2003 | Kuchman ................ 369/275.4 |
| 2004/0130990 | A1* | 7/2004 | Kitamura ................ 369/53.21 |
| 2004/0246869 | A1 | 12/2004 | Dierks |
| 2006/0140108 | A1* | 6/2006 | Schreiber ................ 369/275.1 |

FOREIGN PATENT DOCUMENTS

| | | |
|---|---|---|
| DE | 20012391 | 10/2000 |
| DE | 10116110 | 10/2002 |
| DE | 10150025 | 4/2003 |
| EP | 0520619 | 12/1992 |
| EP | 0914653 | 5/1999 |
| EP | 1436809 | 7/2004 |
| JP | 08297859 | 11/1996 |
| WO | WO-9800842 | 1/1998 |
| WO | WO-9838637 | 9/1998 |
| WO | 01/11617 A1 | 2/2001 |
| WO | WO-02086880 | 10/2002 |
| WO | 03/078146 A1 | 9/2003 |
| WO | WO-2004017306 | 2/2004 |

OTHER PUBLICATIONS

Lou, David Y., "Characterization of Optical Disks," Applied Optics, vol. 21, No. 9, May 1, 1982.

Fox, Barry, "DVD-Audio Still Looking for Hybrid Salvation", p. 8, Hi-FiNews, Dec. 2003.

Fox, Barry, "Opinion", as published in Hi-FiNews, May 2004, p. 17.

Fox, Barry, "Opinion", p. 17, as published in Hi-FiNews, Jun. 2005.

Fox, Barry, "DVD-A Hybrid in Doubt", p. 10, as published in HiFiNews, Jun. 2003.

Fox, Barry, "Opinion" as published in HiFiNews, Jul. 2003, p. 17.

DVD Plus, as found on the World Wide Web at <<http://168.144.40.122/dvdplufrance/historique.html>>, printed on Dec. 10, 2007.

Isailovic: "Videodisc and Optical Memory Systems", Prentice Hall, 1985, p. 48, 52—Relevant excerpt.

Data Sheet: /0000 Technical Data Sheet Polymethyl Methacrylate (PMMA) (Hans Keim Kunststoffe GmbH)., document is undated.

Biaesch-Wiebke, Claus: CD-Player und R-DAT-Recorder: Digitale Audiotechnik in der Unterhaltungselektronik, p. 83, chapter 8.2.1, paragraphs 1-3.

DIN EN 60 908: Digital-Audio-System Compact Disc (IEC 908: 1987 + A1: 1992) Jan. 1994.

"The DVD Plus From which side you look at it . . . " <<http://www.sonopress.de/sononews/15-99/dvdplus.htm>> printed Dec. 7, 1999.

ECMA: Standardizing Information and Communication Systems: Data interchange on read-only 120 mm optical data disks (CD-ROM)—Standard ECMA—2nd Edition—Jun. 1996.

ECMA:Standardizing Information and Communication Systems—80 mm DVD—Read-Only Disk, Standard ECMA—268, 2ND Edition—Dec. 1999.

ECMA: Standardizing Information and Communication Systems—80 mm DVD—Read-Only Disk, Standard ECMA—268—3RD Edition—Apr. 2001.

ECMA: Standardizing Information and Communication Systems—80 mm DVD—Read-Only Disk, Standard ECMA-268—Dec. 1997.

ECMA: Standardizing Information and Communication Systems: 120 mm DVD Rewritable Disk (DVD-RAM)—Standard ECMA—272 2ND Edition—Jun. 1999.

ECMA: Standardizing Information and Communication Systems; 120 mm DVD—Read-Only Disk,; Standard ECMA—267, 2ND Edition—Dec. 1999.

ECMA: Standardizing Information and Communication Systems: 120 mm DVD—Read-Only Disk; Standard ECMA-267, 3RD Edition—Apr. 2001.

ECMA: Standardizing Information and Communication Systems ; Standard ECMA-267—Dec. 1997.

* cited by examiner

HYBRID OPTICAL DATA CARRIER HAVING A MODIFIED CD LAYER

This application is a national phase application under 35 USC §371 of application serial No. PCT/EP2004/012157 filed Oct. 27, 2004, which claims the benefit of German Patent Application serial number 103 51 166.0 filed on Nov. 3, 2003.

Attempts have repeatedly been made to combine a compact disc with more recent data formats or data media on combination discs (hybrid data carriers) which contain data in at least two formats. Particularly with more recent high-resolution music formats such as Super Audio CD (SACD) and DVD-Audio, efforts are being made to achieve compatibility with the compact disc by means of hybrid media, because the equipment base which exists for the reproduction of CD's is considerably larger than the number of DVD-Audio or SACD players, which is still comparatively small. Backward compatibility with the CD-audio might, in this case, make it appreciably easier for new high-resolution music formats to be introduced which, as well as the higher quality of reproduction they gave over the compact disc (CD-Audio) also offered entirely new features such as surround sound, music video, text, and photos or still images providing a pictorial background to the music, and which would therefore have to be considered functionally and qualitatively superior to the compact disc.

Regardless of new audio formats such as SACD and DVD-Audio, it is very attractive for a CD to be expanded to include music video and surround sound (e.g. in the Dolby Digital/AC3 format) by producing a DVD/CD hybrid disc, what is involved in this case generally being a combination of the CD-Audio and DVD-Video formats. What may possibly also be present on the "DVD" is (further) bonus material, such as biographies say, which can be reproduced by a DVD player, or computer-readable information in the DVD-ROM format. This is what the commercially available "DVDplus" format attempts to do (it should be pointed out that alternative spellings such as DVDPlus or DVD-Plus can also be found in the literature).

There have already been attempts to encode surround sound (also known as multi-channel sound) and music video on a compact disc itself, because there is both a standard for the encoding of MPEG-1 video on a CD in the form of "Video CD", and also CD's employing multi-channel encodings such as DTS are commercially available. There can be no question but that the possibilities that DVD-Video offers for music video and surround sound are considerably more advanced than can ever be the case with a CD. This is because it is obvious that the data capacity of a DVD vastly exceeds the capacity of a CD. Because of the large amount of space needed for video and surround sound, proposals which are based on the compact disc therefore, in general, fail to convince.

In the case of the Super Audio CD, there is a hybrid version (SACD/CD) which is compatible both with SACD players and with conventional CD players. In this form of SACD, there are two data layers:

1. A high-resolution SACD layer at a depth of approximately 0.6 mm, which layer is partly reflective of a red laser of a wavelength of approx. 650 nm but is highly transparent to a laser of a wavelength of approx. 780 nm, of the kind which is characteristic of a CD player.
2. The conventional CD layer at a depth of approx. 1.2 mm, looking from the side of the disc which is to be read.

Hybrid SACD/CD media are compatible with almost all CD reproducers but not with all DVD players, some of which will recognise them neither as a "CD" nor an "SACD" but only as a DVD layer which, as they see things, does not conform to the standard or is "damaged", and they then break off the reading process or are unable to initialise the disc.

It is known that a hybrid DVD/CD which is read from one side has not so far been defined, although a hybrid variant of this kind was under discussion for the DVD-Audio standard. In the present-day situation, a combination disc of this kind would not be easy to introduce retrospectively, because many of the existing DVD players or DVD-ROM drives would only recognise a "CD", even though they ought in fact to reproduce a "DVD", or would even break off the reading process because of the partly reflective DVD layer. This is because a DVD layer which is largely transparent to an infrared laser is about 20% reflective of a red laser (wavelength of approx. 650 nm) and this is clearly outside the specifications of a single-layer DVD, whose reflectivity should, under the standard, be 45% to 85%. However, the reflectivity of approx. 20% does conform to the reflectivities of the data layers of a two-layer DVD.

On a DVD player, the process of reading a hybrid DVD (V/A)/CD of this kind which is read from one side therefore either takes place successfully, or it may be broken off because of the failure to comply with the specification, due above all to the too low reflectivity, or a "CD" is recognised even though the DVD player, given its DVD capability, ought to reproduce a "DVD". The way in which a hybrid DVD/CD of this kind which is read from one side will behave on DVD players is therefore very unpredictable, as has now also been confirmed in practice in studies in the field.

Since 1999, there has been an attempt being made to establish a two-sided DVD-CD on the market. It may be because of the lack of support for this variant that the "DVDplus" has not so far gained the commercial success which would undoubtedly be possible for a CD-DVD combination disc.

However, at least some of this lack of support by companies is caused by the fact that which is involved is a data carrier which always fails to meet certain CD or DVD specifications. This is because a DVDplus of this kind generally turns out to be thicker than the maximum of 1.5 mm (relating to the total thickness of a data carrier) which is permitted under the CD or DVD standard when a DVD half-disc is bonded to a CD. If this is done without any other adjustments, this variant is approx. 0.6 mm+1.2 mm=1.8 mm thick. It is possible for the CD side to be thinned down to 1.1 mm because, under the standards defined by Sony and Philips (the "Red Book" etc.), a CD substrate may be between 1.1 mm and 1.3 mm thick. The figure of 1.2 mm is merely an average value. If the CD substrate is produced to the 1.1 mm permitted, a DVDplus is therefore approx. 1.7 mm thick.

This variant is used commercially even though it is "tolerated" rather than "officially permitted" by some licensors due to the failures to comply with the standards. In practice, compatibility with DVD players currently on the market is quite high. Problems arise when the CD side is read by players which have relatively tight thickness tolerances, and particularly in the case of portable CD players ("Discman"), in-car CD players and also portable computers.

If for example the CD layer is thinned down even further, it is true that the total thickness of 1.5 mm which is permitted for a CD or DVD is approached, but when this is the case the thickness of the CD substrate is outside the values officially permitted for a compact disc. It is true that players may then have fewer problems with the thickness of the disc but difficulties then arise more with the reproduction of the data and with correct focussing. One specific problem lies for example in the fact that, just for focussing through a CD substrate, a CD player has to taken into account what is termed "spherical aberration", which latter occurs because the path followed by the light is through a medium (polycarbonate) which is optically denser than air, and is corrected for in the appropriate way in the lens. If the layer thickness of the CD is thinned down too far, it results in the spherical aberration, which is now too small, being over-corrected for in the optical system, which leads to an imaging error. What arises for the CD reading optical system is an effect which is very similar to faulty focussing, or in other words there is an appreciable loss in sharpness in the quality of imaging when the data structures on the CD are being reproduced. The pits and lands by which the information is encoded in the CD data layer are thus not so clearly recognised by the reading optical system, or in other words, as the thickness of a CD substrate is increasingly reduced, so do an increasing number of reading errors occur. Under certain circumstances, the data may even no longer be read at all.

The first actual patent application for a DVD-CD was probably application WO 98/38637, in which a "half-height" CD was bonded to a DVD half-disc. The idea was presumably to describe a DVD-CD of the usual thickness of 1.2 mm, whose total thickness thus did not present any problems. However, it would appear that the idea had not been tried out before the application was made, because it is probably only in the rarest cases that a half-height CD can be reproduced by a CD player. The CD player would have to have a very wide range of focus to focus on a data layer which, under the CD standard, was "too close". Even if a player could do this, there would still be the problem of the "wrong" or excessively small spherical aberration. If a future technical solution to the problem of varying spherical aberration was being hoped for, then there was no mention of this, at least not in the patent application cited.

In what follows, the physical specifications of the compact disc and DVD will be considered, in detail in some cases, and this being the case it would be helpful for better understanding to be familiar with a full statement of physical CD specifications, though is not absolutely essential. Since errors and simplifications now and then occur in the widely used statements of the CD standard, what will be referred to here, by way of example, are the documents of the European Computer Manufacturers Association (ECMA), in which these specifications are described accurately and in sufficient detail. These definitions of the standards are publicly available.

In the case of the compact disc, attention is directed to standard ECMA 130: "Data Interchange on read only 120 mm optical discs (CD-ROM)". The physical specifications for CD-Audio are identical because, as far as the physical specifications are concerned, the CD-ROM format is based entirely on the original CD-Audio specification (CD-ROM is of course a different format from CD-Audio). Information on the physical specifications of the DVD, particularly with regard to stipulations relating to substrate thickness and to the refractive index of the material to be used, can be found in standards ECMA-267 and ECMA-268 respectively.

Essentially, there are at the present time three forms of DVD-CD which are known to be sold commercially, generally under the name "DVDplus". The most common is currently the variant of a thickness of approx. 1.7 mm in which the two sub-discs, CD and DVD, each of the minimum permitted substrate thickness, are bonded together, the data layers being situated opposite one another but not of course being read from the same side, because they are optically separated from one another. There are also DVD-CD variants whose total thickness is equal to or less than 1.5 mm, in line with the total thickness of 1.5 mm which is laid down for a (single) compact disc or DVD under the CD and DVD standards. Given that in these variants it is only the CD side which has been modified or thinned down, they have an advantage from the point of view of licensing. The reason for this is that the disc can be called a "DVD" because the DVD side meets the relevant DVD specifications. Because the CD-Audio patents will be expiring shortly, a DVD/CD-A of this kind can therefore be produced without the consent of the relevant holders of rights because it combines a ("legal") DVD with a format which perhaps cannot be called "compact disc" but which also cannot be "forbidden". Although this disc creates relatively few problems from the legal point of view and cannot for example be forbidden by the holders of the DVD rights, as a "CD" it may possibly not be compatible enough. A third variant would be a DVDplus of a thickness of between 1.5 mm and 1.7 mm, i.e. a solution which represented a compromise between thickness problems and CD readability. Generally speaking, it is not only the CD layer which can be thinned down but to a small extent the thickness of the DVD sub-substrate can also be reduced, e.g. to 0.55 mm. However, in the single-layer DVD-5 as defined in the standard, the permitted minimum is precisely 0.57 mm and because of the small tolerances which are possible for deviations in DVD's there certainly cannot be any major drop below this latter figure.

The layer of adhesive between the DVD and CD substrates can certainly be reduced in comparison with the figures which are usual (normally approx. 60 µm), because, under the DVD standard, this layer is not defined as of any specific thickness in the versions such as DVD-10 and DVD-18 which are read from two sides (although it does follow in some cases from other DVD specifications, an upper limit for example being set for it by the total thickness of a DVD). If the layer of adhesive can be reduced to for example 10 micrometers, a DVD-CD will still become 0.05 mm thinner in comparison with the case where the thickness is 60 micrometers. Because the aim is, in the ideal case, to slim a DVDplus down from approx. 1.7 mm to 1.5 mm at most, which is a difference of 0.2 mm, the above possibility should not be neglected.

If two DVD layers are present in a DVDplus (DVD-9/CD), they have however to be separated by a transparent layer measuring at least 40 micrometers, as is stipulated in the DVD specifications. If the transparent separating and adhesive layer were too thin, the reading optical system might possibly not be able to distinguish between the two layers to a sufficiently high standard, i.e. the two data layers would affect each other optically in the reading process. An optical crosstalk effect is intended to be ruled out as far as possible by having an adequate spacing between the layers.

However, in the two-layer case the first DVD layer may be situated at a depth of 0.55 mm from the surface to be read, as a result of which the complete DVD substrate becomes at least 0.59 mm thick. It also has to be borne in mind that in this case the lengths of the data-carrying structures (the pits and lands) are increased by 10%.

More recent experiments have resulted in the production of a 1.48 mm DVDplus, but to date this is a long way from running on all reproducers. There have also been experiments with DVD-CD hybrids of thicknesses of 1.55 mm and 1.6 mm.

The most common form to date, of approx. 1.7 mm, works very well if a CD player (and of course a DVD player) which reads it will tolerate a slightly increased thickness. This need not necessarily be the case, and for this reason the search for thinner forms is both advisable and understandable. It is questionable whether the experiments which have so far been made give better results and greater compatibility than the version of approx. 1.7 mm which is already available commercially, and this is something that will always have to be demonstrated in actual tests.

When a CD substrate is being reduced, it is helpful for the patterns of information which are to be read (the pits and lands) to be produced very accurately, or in other words with very good optical properties for reading purposes. Because of the optical changes which it involves (and particularly the difference in spherical aberration), a reduction in a CD substrate itself results in a degradation of the reading signal, and because of this care should be taken in the production of the discs to see that there are clean pit and land structures in the finished product and that only slight fluctuations occur relative to the ideal length of these structure (jitter), which fluctuations would make it even more difficult for the signal to be read, or would further degrade the quality of the signal. For the optical system and electronics performing the reading, clear optical structures and low jitter in the medium give good signal quality and easier readability.

Even if the CD sub-substrate of a DVDplus is produced with low jitter and clearly defined readable structures, the two of which together result in a good reading signal, at some time or another limits will be reached when the CD side is being thinned down which cannot be dropped below if the data is still to be capable of being reproduced reliably. In the present invention, it is proposed that the patterns of information (pits and lands) which are read from a read layer be enlarged within a hybrid data carrier, which makes them more easily recognisable, particularly when spherical aberration occurs, and improves the reading signal generally. An effort is made to at least get close to the total thickness of 1.5 mm which is the maximum permitted for optical data carriers under CD and other standards, or even perhaps to reach this figure or go below it, without placing excessively great restrictions on the compatibility of a hybrid data carrier of this kind with existing CD players and, for example, DVD players. The enlargement relates in this case at least to a lengthening of the data structures in a CD layer (the pits and lands), but under certain circumstances this may be combined with a widening of these readable structures, where this is advantageous.

Even though the enlargement or lengthening of the pit and land structure results in a reduction in playing time, this effect can be compensated for by a reduction in the track pitch of the CD layer according to the invention which takes place at the same time, because the latter measure results in turn in an increase in playing time. The term "playing time" relates in the present case to a CD-Audio, but a DVDplus need not by any means relate only to a combination of a DVD and a CD-Audio. In fact any CD format is possible, just as any DVD format is possible in the case of a DVDplus. Generally speaking, it can also be said that the "capacity" of a CD is increased by reducing the track pitch because the term "capacity" is more apposite in the case of a CD-ROM for example than "playing time", which is apposite for a CD-Audio or even a Video-CD. In this connection, it is believed that a hybrid DVD-CD according to the invention can advantageously be combined with a reduction in the refractive index of the disc material which is used. For certain CD players, a CD layer approx. 0.9 mm away from the surface of the disc would be too close in optical terms. To put it another way, this value would be outside, or too close to the boundary of, the range of focus of a lens system. Without the need for this question to be considered in detail, the reduction in the refractive index produces, for the optical system of a reader, an apparent extension of the thickness of the substrate. This is because the substrate is itself part of an optical system. If a 1.2 mm thick CD substrate has a refractive index of, for example, 1.5 then, due to the refractive effect which takes place, the optical system of a reproducer "sees" a data layer at a depth of "0.8 mm". For the optical system doing the reading, or for the lens system, a reduction in the refractive index therefore results in an extending of the depth at which the layer is actually seen, and the reduction of the thickness of the substrate can therefore perhaps be compensated for by other disc materials having a lower refractive index than exists in the case of polycarbonate, or what may also be involved may be chemically varied variants of polycarbonate. Limits do of course exist in this case because, when the refractive index is lower, the spherical aberration (which the system is designed for) is reduced at the same time. This would have to be compensated for by materials of a higher refractive index, which means that there would be a counterbalancing effect. This merely confirms practical experience which shows that thinner DVD-CD variants cannot be produced solely by using new disc materials.

What will be considered in detail, because it is with this that the invention proper is concerned, is the physical specifications for pit structures which are laid down in the CD standards, given that a conscious departure is being made from these. Especially for audio reproduction, a CD reader has to read a given amount of data per second so that two audio channels which, as is known, are encoded in 44.1 kHz/16 bit PCM, can be reproduced as well as other ancillary information. A certain data rate thus has to be maintained. As well as the actual useful or net data rate, it is clear that, for error correction, a certain amount of additional data, such as so-called product codes, is required to enable reading errors to be corrected mathematically. With regard to the speed of reading, it is known that CD-ROM drives for example are able to step up the basic speed known from CD-Audio by a multiple, because a high data rate is desirable for reading and writing in the computer field. In the literature, the basic speed in the original CD definitions is referred to as "single speed", whereas nowadays speeds of up to 48 times this data rate or even more are perfectly normal with CD-ROM drives. In the CD-Audio standard the data rate is preset precisely, but not the lengths of the pit and land structures, i.e. the linear reading speeds or the speeds of revolution of drives which follow from these, all of which are able to be flexible within a certain range.

As is known, the data on a CD is encoded by so-called "eight to fourteen" modulation" (EFM) which however, because of three connecting bits which are present after each word of data, can also be considered 8:17 modulation. Broadly speaking, what is involved is an RLL(2, 10) modulation. There is no need for RLL modulations to be explained in this connection as they are generally familiar in magnetic and optical storage. In this form of modulation, a "1" is represented by a change in magnetic flux and by an optical change (pit→land, land→pit) in the respective cases. Because a minimum of two and a maximum of ten zeroes occur between these changes in an RLL(2, 10) modulation, the minimum length of a pit or land is 3T and the maximum length 11T. The density ratio DR in EFM modulation is known to be 24:17, or approx. 1.41. Hence, what are encoded in the smallest detectable units are 1.41 bits, and not 1 bit for example, which gives a higher capacity and speed than less effective methods. As a comparison, the more recent EFM-Plus modulation of the DVD is also an RLL(2, 10) method, with a density ratio of 1.5. Newer methods of coding, such as PRML, have for some time now been making their way into the field of optical media, but they will not be looked at here.

Under the normal and basic CD specifications, the shortest allowable pit length (and land length), 3 T, is between 0.833 and 3.054 µm and the longest allowable lengths, 11 T, are approx. 0.972 µm to 3.564 µm (maximum values are rounded off). Because of the preset data rate, these values correspond to directly proportional speeds of revolution for the CD, on which the linear reading speed between the reading head and the data-carrying medium in turn depends. At the highest data density on the medium (3 T=0.833 µm), the linear reading speed between the head and the medium is 1.2 m/s, and at the lowest data density (3T=approx. 0.972 µm) it is 1.4 m/s.

The flexibility in these specification is explained by the fact that in defining the CD-Audio standard there was a conscious desire to make the production of CD's easier, because discs with larger structures can be produced more easily and also have less jitter. In practice, the figure of 1.4 m/s called for by the longest pit structures (lowest data density) is no longer used today in the manufacture of discs, as discs can be produced to a high quality even at the maximum capacity and it would merely reduce the usable playing time of the disc. What is therefore predominantly used today is the value of 3 T=0.833 micrometers, or in other words a linear speed of 1.2 m/s. A speed of 1.3 m/s (corresponding to 3 T=approx. 0.9025 micrometers, the mean of the above values) is however relevant in that it can be considered a mean under the CD standard, from which an upward or downward departure can be made. An upward departure is not normal however. Particularly with a CD-ROM and its higher capacity, the pit lengths used are almost always the minimum ones, because this is the only way in which a capacity of approx. 650 Mbytes can be achieved for a CD-ROM. In hybrid discs having a CD layer, a corresponding departure (larger pit structures corresponding to a linear speed of more than 1.3 m/s) has, to date, never been used and it is put forward here as an "optical aid" specifically for the reading of a thinner than usual CD substrate.

The second relevant factor relating to readable physical structures in a CD layer is the track pitch. Under CD standards, this is 1.6 µm+/−0.1 µm. The range defined is therefore one from 1.5 µm to 1.7 µm. In contrast to the above case, what is generally used on pressed CD-Audio and CD-ROM discs is the mean of 1.6 micrometers, and precisely not the minimum value. This may be due to the fact that the value in question has more to do with the servos and tracking of a CD player, whereas problems with the production of CD's have generally been solved. At least as far as I am aware, there are no examples of 1.7 micrometers being used in practice. 1.5 micrometers, the minimum value for track pitch, is often used in practice however. With a linear speed of 1.2 m/s and a track pitch of 1.5 micrometers, the maximum permitted playing time of a CD-Audio is obtained, as also, in more general terms, is the maximum permitted capacity under the standard, the latter being particularly relevant to the CR-ROM and CD-R standards. In the case of CD-Audio, track pitches of 1.6-1.5 micrometers can be used when the playing time of a CD is to be more than approx. 75-76 minutes. The theoretical maximum as far as playing time is concerned is then—if minimum pit lengths are used at the same time—approx. 80 minutes. Exact playing times cannot be given, because the lead-out of a compact disc can also be partly used for data (music in the present case) if a departure is made from the stipulations of the CD standard, which is possible in the present case within certain limits. The track pitch of 1.5 micrometers has now become very important for "80 minute" CD-R's (or CD-RW's), i.e. writable CD's. This 80 minutes of playing time corresponds to the approx. 700 Mbyte capacity of a "CD-R80", as is generally known.

To sum up, it can be said that for CD's produced by the injection moulding process (non-assembled CD's) a linear reading speed of 1.2 m/s with corresponding pit lengths is normal, together with a track pitch of 1.6 micrometers (the 1.2 m/s is a "single speed" of the kind which is normal for the reading of a CD-Audio). If required, the track pitch in particular is taken below the figure mentioned, in the direction of 1.5 micrometers, or rather it is the actual figure of 1.5 micrometers that is used in most cases. Only quite seldom is a linear speed of 1.3 m/s found, but conceptually this is the mean of the linear density of a CD. As far as I am aware, no use is made in practice of departures in respect of the linear density of a read-only compact disc, or in respect of its mean track pitch, in the direction of the "upper tolerance", even though such departures are defined. However, in hybrid discs, e.g. a DVD-CD, such departures in the direction of the "upper tolerance" and beyond it have the effect, which can be exploited, of raising the signal quality from the CD side of a hybrid storage medium of this kind, as is proposed in the present case.

There is however one relevant application in which beneficial use is made, on a CD, of the maximum linear speed of 1.4 m/s, corresponding to the maximum possible pit lengths. This is the recording of music on a CD-R, in which longer pit lengths on the medium demonstrably lead, on the CD-R media, to less jitter in the data which is recorded.

Whether there is any audible evidence of less media jitter when a CD-Audio is being reproduced will depend on the susceptibility of a reproducer to being affected by media jitter. It is clear that the very thing that a good CD player should do is to eliminate media jitter when reproducing the audio data by, say, providing a DAC with a timing which is separate, accurate and independent of the process of reading the CD. Although this sounds easy, media jitter may in fact give rise to reproduction jitter in the reproduction of CD's, with audible consequences. Consequently, whether the "Audio Master Quality Recording" process which has been introduced by Yamaha will therefore give an improvement in audio reproduction will also depend on the CD player. Nevertheless this process may prove to be beneficial in practice. Even though the present invention does not have any connection with and was not inspired by this process, there is an obvious similarity in that in both cases the quality of reproduction, i.e. the quality of the reading signal, is improved by enlarged pit structures.

In general, the tolerances of present-day CD reproducers are in most cases considerably larger than the ranges laid down in the CD standards, a fact that is helpful to the present invention. In this way, there are now 90 minute and even 99 minute CD-R's which, particularly in the first case, are highly compatible with existing readers. It is true that writing extra-length (>80 minutes) CD-R's with existing CD writers may present problems, but for reading on the majority of CD drives, CD players, etc. they present relatively few problems because time codes or "addresses" for up to 90 minutes are already defined in the normal CD standard. In the case of the "High Capacity Recording" discs sold by TDK, the track pitch of a CD-R of this kind is only 1.33 µm, which is a long way below the "official" minimum of 1.5 micrometers. The wide usability of the media in question speaks for itself.

It is possible to define CD media giving more than 90 minutes, but if this is done the media may cause problems on readers because time codes or addresses beyond 90 minutes may be interpreted as "negative" (i.e. the lead-in of a compact disc). This is a problem relating to addressing. If a film (on a VCD) or a CD-Audio is played, then a CD99 (or CD-R99) of this kind generally works without giving any trouble when played 30 straight through, even though it may no longer be possible to select tracks at beyond 90 minutes. This shows that it is in fact chiefly a matter of addressing problems, but that, because of the wide tolerances of the players, departures from standards in relation to physical CD specifications do not, as a rule, constitute a major problem. Philips has now officially defined a "High Capacity Recordable Disc" for up to approx. 98 minutes. The actual physical specifications in this case are a track pitch of 1.28 μm, which gives a data density or capacity which is increased by 25% compared with the standard track pitch. The linear speed is likewise below the "permitted" minimum value of 1.2 m/s, and in this case is 1.13 m/s.

Since the efforts to produce CD's of higher capacity than 80 minutes of audio or MPEG-1 video already go back for some years, there may be other values that deviate from the CD standard that may be encountered in practice. What is always involved in an increase in the data density. However, these CD's do not conform to the standard, i.e. their function is particularly limited as an interchangeable data format. Nevertheless, the compatibility particularly of CD's with a playing time of approx. 90 minutes is amazingly high.

The present invention relates to enlarging the pit structures of a CD layer when the layer is present in a hybrid disc, together with a different date format, in the same medium, such for example as in a hybrid DVD-CD (DVDplus). This enlargement makes good sense particularly when the CD substrate is situated at a depth of less than 1.1 mm, looking from the surface to be read, and is thus of less than the minimum CD substrate thickness which is laid down under CD standards. In the actual example of application, this reduction is desirable because the total thickness of a DVD-CD is to be reduced in the direction of 1.5 mm, or in the ideal case the total thickness is to be equal to or less than 1.5 mm. There are embodiments according to the invention both in the case of discs which are read from two sides, such for example as a two-sided DVD-CD ("DVDplus") and also in the case of types where the CD layer is combined on the same side with a further data layer in a different format. What will actually be referred to will be a two-sided SACD/DVD/CD, i.e. a hybrid SCAD/DVD having a CD layer. As I have myself proposed, an SACD/CD is (normally) combined with a DVD half-disc in this case. When this is the case, it makes senses for the thickness of the SACD/CD side to be reduced, or in other words for the CD layer to be "raised" from 1.2 mm to 0.9 mm. The procedure for this purpose has already been described elsewhere, and in the present case too it makes good sense for the reading signal from the CD layer to be improved by enlarging the pit structures.

It is recommended that the length of the pit structures be increased beyond the value which arises from a linear speed of 1.3 m/s. For a speed of 1.2 m/s, a pit length of 3 T=0.833 micrometers to 11 T=3.054 micrometers is given in the literature (these values are probably not quite exact, but have been taken from the literature in this case).

For the linear speed of 1.3 m/s, the values that are obtained by multiplying by a factor of 1.3/1.2 are thus 3 T=0.9024 micrometers and 11T=3.3085 micrometers (values are rounded off). In CD layers according to the invention, the relevant values are therefore always larger than the lengths of approx. 0.9024 micrometers to 3.3085 micrometers which are obtained for a linear speed of 1.3 m/s.

When enlarging pits and lands, there is nothing to suggest that, for example, the maximum length which is possible under the CD standard should not be used, or in other words the values which correspond to a linear speed of 1.4 m/s. These values are between 3 T=0.972 micrometers and 11T=3.564 micrometers. A disadvantage of such an enlargement is that the playing time of a CD-Audio would be reduced to approx. 63 minutes if a standard track pitch of 1.6 micrometers were maintained. Under the CD standard, it is possible for the latter to be reduced to 1.5 micrometers, as a result of which the playing time goes up to approx. 67-68 minutes. However, as has been substantiated above, track pitches of, for example, 1.4 micrometers, 1.33 micrometers, 1.27 micrometers or possibly even less may also be used. The lowest value quoted corresponds to a lengthening of the playing time of approx. 26%, whereas the reduction in playing time at a speed of 1.4 m/s, as compared with the usual 1.2 m/s, is only 17%.

Efforts are being made to bring a CD substrate down to approx. 0.9 mm from the 1.1 mm which is (still) allowed under the standards. If a CD substrate of approx. 0.9 mm is combined with DVD substrates of approx. 0.57 mm then, with optimised bonding processes, DVD-CD hybrids of a thickness of less that 1.5 mm can be obtained, which gives a DVD complying with the standard which is combined with a modified CD side. To enable this rather demanding goal to be reached, the CD standard may also be completely abandoned in respect of the pit and land lengths which are used. It is suspected that this may even be particularly advantageous.

If the pit and land structures are enlarged by 25%, on the one hand a linear reading speed of 1.5 m/s is obtained, and on the other hand the corresponding lengths are (approximately) 1.041 micrometers for 3 T and 3.818 micrometers for 11T. The 25% reduction in playing time can be completely compensated for, or even more than compensated for, by an adjustment of or reduction in the track pitch which takes place at the same time.

It is true that the enlargement of the pit structures results in a failure to observe the recommendations made in the CD standards, but the very thing that it gives with thinner CD substrates is an increase in compatibility, and it therefore obviously makes good sense with hybrid discs if the total thickness of the disc is to be reduced. Because of the tolerances which certainly exist for altered pit lengths and playing speeds in existing CD players, this step does not, in general, result in playing problems, unlike a reduction in the depth of the CD layer or a reduced thickness for a CD substrate. The present invention is an explicit attempt to make such thinner CD substrates better fitted for practical use by improving their reading properties, possibly in co-ordination with other changes such as the use of a material of a lower refractive index than the polycarbonate which is usual for CD's (the refractive index is approximately 1.58 in the case of CD's, with slight variations).

At the moment, increased efforts are again being made to combine DVD formats such as DVD-Video, and particularly DVD-Audio, with a CD layer which is backwardly compatible with CD players, from which the practical relevance of the invention is obvious, given that it is an improvement to existing versions and formats such as DVDplus. (The invention can for example also be used in the production of a relatively thin SACD/CD/DVD, as shown above.) Although what is claimed for the invention may relate to a DVDplus of a height of 1.7 mm and would result in an improvement in the reading signal, it is particularly helpful in the production of CD substrates thinner than 1.1 mm. A DVD-CD which presents music, for example, in different formats and resolutions might, in principle, be replaced by two separate discs, i.e. a DVD and a CD each in a separate form. However, it is not in the interests of the music industry or record companies to offer two physical copies of the same recording for the same, or an only slightly increased, price. This is the basic advantage of any hybrid disc which contains music, video, software etc. in two or more formats. There is always only a single physical copy, but this is compatible with more players than the individual formats/discs.

In what follows, the drawings, which in the present case serve mainly to illustrate what has been said up to this point, will be considered. Embodiments according to the invention will be described by reference to DVD-CD combination discs.

Figure 1:
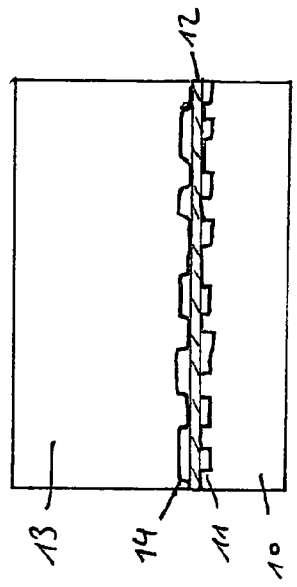
FIG. 1 shows a conventional DVD-CD, or "DVDplus".

In FIG. 1 is shown a conventional DVDplus of a height of for example 1.7 mm. Looking from the side which is at the bottom in the drawing, there is a DVD half-disc 10 present which includes a data layer 11. The half-disc 10 and data layer 11 should conform to the DVD standard in this case, i.e. should be within the physical DVD specifications. The DVD and CD sides are separated by a layer of adhesive 12 and in a DVDplus this layer of adhesive is usually non-transparent. It may be thinned down to a few micrometers and in double-sided DVD's the said layer of adhesive would be, for example, 55 micrometers thick. On the second side, i.e. the side which is at the top in FIG. 1, there is a (metallised) data layer 14 on the transparent polycarbonate substrate 13. With regard to its pit structure, this layer meets the recommendations made in the CD standards and is itself situated in the interior of the hybrid DVD-CD. It should be pointed out that a DVDplus can also be produced with two DVD layers, although up to now this has not been usual.

Figure 2:
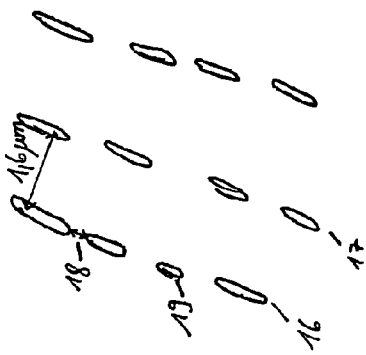
FIG. 2 shows the pit and land structures of a conventional DVD-CD.

In FIG. 2, the pit structures of a CD layer inside a DVD-CD hybrid disc are shown enlarged and from above. The drawing is schematic and not true to scale. Two data tracks 16 and 17 are at a pitch of 1.6 micrometers, as is generally the usual case with CD's. Two minimum lengths 3 T of 0.833 micrometers, corresponding to a linear reading speed of 1.2 m/s, are shown, for both a land (18) and a pit (19). Note: although a CD or DVD has a spiral of data and strictly speaking does not have tracks which are exactly parallel, virtually parallel tracks spaced 1.6 micrometers are seen, at least at high enlargement.

Figure 3:
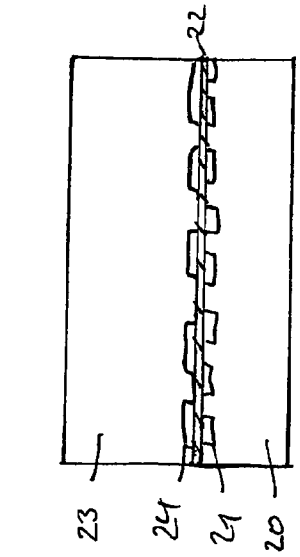
FIG. 3 shows a DVD-CD according to the invention having modified pit structures.

FIG. 3 shows a modified DVD-CD according to the present invention. There is likewise a DVD substrate 20 and a DVD data layer 21 present. In respect of substrate thickness and pit structures, these should, once again, be within current physical specifications of the kind which have been drawn up for DVD's. If required, the thickness of the DVD substrate may however be slightly reduced in comparison with the standard specifications. For an optical correction due to the degradation of the reading signal, the pits and lands could if necessary be enlarged slightly in the case of the DVD too. For DVD's however the tolerances are generally rather tight. In FIG. 3, a layer of adhesive 22 should be produced in as thin a form as possible, i.e. the thickness can and should be clearly less than approx. 40 to 60 micrometers if a contribution is to be made to reducing the total thickness of a DVD-CD hybrid disc. The CD substrate 23 is 0.9 mm thick in this embodiment and the CD layer 24 has pit structures which are modified in accordance with the invention.

Figure 4:
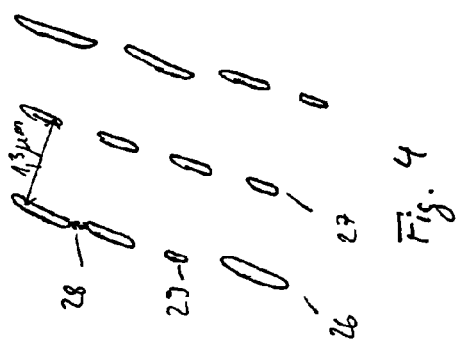
FIG. 4 is a schematic plan view showing the pit structures of a DVD-CD according to the invention, very much enlarged.

FIG. 4 looks at these modified pit structures. Once again, there are two data tracks 26 and 27 present, which are shown in plan and very much enlarged. A striking feature is the closer pitch of the tracks, which in this embodiment is 1.3 micrometers and by which the loss of linear bit density caused by the enlargement of the pit structures is compensated for. The two effects approximately cancel each other out and the data capacity of the "CD" layer of this disc is approximately as high as on a standard CD. There are two minimum bit lengths 3 T present, and these are once again shown for a land (28) and a pit (29). A linear reading speed of 1.5 m/s is taken as a basis, and in comparison with FIG. 2 this results in the pit dimensions being lengthened by 25% and in a better reading signal, particularly when aberration effects occur. As has already been stated above, the length 3 T is approximately 1.041 micrometers in the present case or 0.833 micrometers * 1.25.

The present invention, which always defines hybrid data carriers having at least two data layers and never, say, a single CD, relates as a rule to read-only discs, but need lo not necessarily do so. A read-only CD layer having pits and lands could for example be combined with a writable or re-writable CD. It would even be conceivable for a writable or re-writable CD layer to be used, in which case it would not be pits and lands which were lengthened in this case in comparison with normal CD values but optically distinguishable effects such as "light" and "dark" in writable or re-writable materials.

Current examples of applications for the invention would be both a read-only DVD-CD (DVDplus) and also a SACD/CD/DVD which was able to combine today's widely used audio formats SACD, CD, DVD-Video and DVD-Audio with one another. As is known, CD's and DVD's may also be produced in a diameter of 8 cm and not simply in one of 12 cm. Variants of this kind, and others, are taken into account in the claims which define the invention.

In future, it would for example also be conceivable to combine a layer for a blue laser with a CD layer. Toshiba/NEC's "Advanced Optical Disc" has for example been defined for a 0.6 mm substrate, which corresponds to the conditions in a DVD. It is obvious that combining an AOD and a CD layer may produce a disc which is thicker than 1.5 mm unless the CD-sub-substrate is thinned down. As in the case of a DVDplus, the present invention provides assistance in this direction in that the intention is for the signal quality from a thin CD substrate to be improved.

Other versions and embodiments can be seen from the claims.

As has already been stated, further steps may be taken, in order for example to 30 make it easier for the optical system of a CD player to focus on a CD layer which lies relatively close. In this case, the refractive index of a disc material which was used would usefully be reduced from the value which is usual for a CD (approx. 1.58). Conversely where the aim is to achieve "normal" spherical aberration, it is also possible for the departure from the refractive index to be in the upward direction. However, it is suspected that a reduction in the refractive index will be preferable as a rule. The recommendation is therefore that the present invention be combined with a refractive index of the order of 1.4-1.55, although this still has to be tested in practice.

If the lengthening of the pits and lands alone produces a sufficiently compatible DVDplus, then present-day materials and productions processes can be left largely unchanged while it will only be the CD masters or matrices which are used in the injection moulding process which will have to be adapted, the lengths of the pits and lands being increased in this case as described.

The CD layer can conform to any CD format, which means that a plurality of CD formats can also be combined in one CD layer. The CD-Audio and CD-ROM formats for example may be combined on multi-session CD's. This is also something which is general and usual today, so that for example anti-copying protection against the copying of CD-Audio's can also be provided on computers, which is done by causing the latter to recognise a "CD-ROM". This is not of course "hard" anti-copying protection.

The invention claimed is:

1. Optical data carrier in disc format having at least one CD layer having optically readable CD data structures whose lengths, to suit EFM modulation, are between 3 times and 11 times a basic length T, wherein
   3 times the basic length T (the 3T value) is at least 0.9 micrometers,
   11 times the basic length (the 11T value) is at least 3.3 micrometers,
   from that surface of the data carrier through which the CD layer is read, the CD layer is situated at a depth of less than 1.1 mm,
   the data carrier has exactly one further data layer, namely a DVD layer,
   the CD layer and the DVD layer are read from opposite sides of the data carrier, and
   the data carrier has a DVD substrate of a thickness of less than 0.570 mm, and at least 0.55 mm.

2. Data carrier according to claim 1, in which the thickness of the DVD substrate is substantially 0.55 mm.

3. Data carrier according to claim 1, wherein the pits and lands of the DVD layer are enlarged to ensure optical compensation for a degradation of the reading signal.

4. Data carrier according to claim 1, wherein the refractive index of a transparent material which is used for a CD substrate is less than 1.58.

5. Data carrier according to claim 1, wherein the refractive index of a transparent material which is used for the CD substrate is in the range from 1.4 to 1.55.

6. Data carrier according to claim 1, wherein 3 times the basic length T (the 3T value) is at least 0.98 micrometers and 11 times the basic length (the 11T value) is at least 3.57 micrometers.

7. Data carrier according to claim 1, wherein a track spacing of the CD data structures is less than 1.6 micrometers.

8. Data carrier according to claim 1, wherein the CD layer is partly read-only.

9. Data carrier according to claim 1, wherein a total thickness of the data carrier is not more than 1.7.

10. Data carrier according to claim 1, wherein a total thickness of the data carrier is not more than 1.5 mm.

11. Data carrier according to claim 1, wherein the data carrier has a diameter of less than 12 cm.

12. Data carrier according to claim 1, wherein, from that surface of the data carrier through which the CD layer is read, the CD layer is situated at a depth of less than 1.05 mm.

13. Data carrier according to claim 1, wherein, from that surface of the data carrier through which the CD layer is read, the CD layer is situated at a depth of substantially 0.9 mm.

14. Data carrier according claim 1, wherein the refractive index of a transparent material which is used for the DVD substrate is in the range from 1.4 to 1.55.

15. Data carrier according to claim 1, wherein the data carrier has at least two substrates having different refractive indexes.

16. Data carrier according to claim 1, wherein the readable structures of the CD layer are widened.

17. Data carrier according claim 1, wherein the readable structures of the CD layer are of a width of more than 500 nm.

18. Data carrier according to claim 1, wherein a track spacing of the CD data structures is less than 1.5 micrometers.

19. Data carrier according to claim 1, wherein the CD layer is entirely read-only.

20. Data carrier according to claim 1, wherein a total thickness of the data carrier is not more than 1.6 mm.

21. Data carrier according to claim 1, wherein the data carrier has a diameter of substantially 8 cm.

22. Data carrier according to claim 1, wherein, from that surface of the data carrier through which the CD layer is read, the CD layer is situated at a depth of less than 1.00 mm.

23. Data carrier according to claim 1, wherein the readable structures of the CD layer are of a width of more than 600 nm.

24. Optical data carrier in disc format having at least one CD layer having optically readable CD data structures whose lengths, to suit EFM modulation, are between 3 times and 11 times a basic length T, wherein
   3 times the basic length T (the 3T value) is at least 0.9 micrometers,
   11 times the basic length (the 11T value) is at least 3.3 micrometers,
   from that surface of the data carrier through which the CD layer is read, the CD layer is situated at a depth of less than 1.1 mm,
   the data carrier has at least two further DVD layers,
   the CD layer and the DVD layers are read from opposite sides of the data carrier, and
   the data carrier has a DVD substrate of a thickness of less than 0.550 mm, and at least 0.53 mm.

25. Data carrier according to claim 24, wherein the pits and lands of the DVD layers are enlarged to ensure optical compensation for a degradation of the reading signal.

26. Data carrier according to claim 24, wherein the refractive index of a transparent material which is used for a CD substrate is less than 1.58.

27. Data carrier according to claim 24, wherein the refractive index of a transparent material which is used for the CD substrate is in the range from 1.4 to 1.55.

28. Data carrier according to claim 24, wherein 3 times the basic length T (the 3T value) is at least 0.98 micrometers and 11 times the basic length (the 11T value) is at least 3.57 micrometers.

29. Data carrier according to claim 24, wherein the total thickness of the data carrier is not more than 1.7 mm and preferably not more than 1.6 mm.

30. Data carrier according to claim 24, wherein the total thickness of the data carrier is not more than 1.5 mm.

31. Data carrier according to claim 24, wherein the data carrier has a diameter of less than 12 cm, and preferably a diameter of approximately 8 cm.

32. Data carrier according to claim 24, wherein the CD layer is combined with two DVD layers and an SACD layer, the DVD layers and the SACD layer being read from opposite sides of the data carrier, and wherein the CD layer is situated below the SACD layer so that the SACD layer and the CD layer are optically separated from the DVD layers.

33. Data carrier according to claim 24, wherein, from that surface of the data carrier through which the CD layer is read, the CD layer is situated at a depth of less than 1.00 mm, and preferably at a depth of substantially 0.9 mm.

34. Data carrier according to claim 24, wherein the refractive index of a transparent material which is used for the DVD substrate is in the range from 1.4 to 1.55.

35. Data carrier according to claim 24, wherein the data carrier has at least two substrates having different refractive indexes.

36. Data carrier according to claim 24, wherein the readable structures of the CD layer are of a width of more than 500 nm and preferably of a width of more than 600 nm.

* * * * *